(12) United States Patent
Pritchard

(10) Patent No.: US 10,578,169 B2
(45) Date of Patent: Mar. 3, 2020

(54) REDUCED AXIAL LENGTH INCREASED CAPACITY SYNCHRONIZER

(71) Applicant: BorgWarner Inc., Auburn Hills, MI (US)

(72) Inventor: Larry A. Pritchard, Macomb, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 501 days.

(21) Appl. No.: 15/175,596

(22) Filed: Jun. 7, 2016

(65) Prior Publication Data

US 2017/0350458 A1 Dec. 7, 2017

(51) Int. Cl.
*F16D 23/06* (2006.01)

(52) U.S. Cl.
CPC ...... *F16D 23/06* (2013.01); *F16D 2023/0618* (2013.01); *F16D 2023/0681* (2013.01)

(58) Field of Classification Search
CPC ............. F16D 23/06; F16D 2023/0631; F16D 2023/0656; F16D 2023/0662; F16D 2023/0681; F16D 2023/0618
See application file for complete search history.

(56) References Cited

U.S. PATENT DOCUMENTS

| | | | |
|---|---|---|---|
| 4,727,968 A * | 3/1988 | Chana | F16D 23/06 192/108 |
| 5,135,087 A | 8/1992 | Frost | |
| 5,407,043 A * | 4/1995 | Yamada | F16D 23/025 192/107 M |
| 5,585,166 A | 12/1996 | Kearsey | |
| 5,657,844 A | 8/1997 | Wagner | |
| 6,427,818 B1 | 8/2002 | Borg | |
| 6,588,563 B1 | 7/2003 | Sarrach et al. | |
| 6,626,277 B2 | 9/2003 | Hauf | |
| 7,367,437 B2 | 5/2008 | Buhlmaier et al. | |
| 7,383,931 B2 | 6/2008 | Giese et al. | |
| 7,478,718 B2 | 1/2009 | De Maziere | |

(Continued)

FOREIGN PATENT DOCUMENTS

| | | | |
|---|---|---|---|
| DE | 1906863 A1 * | 8/1970 | ........... F16D 23/025 |
| WO | 2008/007083 A1 | 1/2008 | |

OTHER PUBLICATIONS

Machine translation of DE 1906863 obtained from EPO.org on Nov. 13, 2018. (Year: 2018).*

*Primary Examiner* — Richard M Lorence
(74) *Attorney, Agent, or Firm* — Warn Partners, P.C.

(57) ABSTRACT

A synchronizer is provided for torsionally connecting a gear to an axially aligned shaft. The synchronizer includes a hub connected with the shaft, a sleeve having an inner diameter with spline teeth for torsional connection with the hub being axially movable upon the hub, a blocking ring torsionally connected on the hub having an angular lost motion relationship with the sleeve, the blocking ring having at least a first annular conical friction surface orientated radially inward and axially toward the hub and a second annular conical friction surface oriented radially inward and axially outward from the hub, the blocking ring having blocking cogs preventing axial movement of the sleeve toward the gear when the gear is in a non-synchronous condition, and an engagement ring for fixed connection with the gear, the engagement ring having a complementary annular conical friction surfaces.

17 Claims, 15 Drawing Sheets

(56) References Cited

U.S. PATENT DOCUMENTS

| | | |
|---|---|---|
| 7,717,247 B2 | 5/2010 | Stockl et al. |
| 7,980,989 B2 | 7/2011 | Oswald et al. |
| 8,342,051 B2 | 1/2013 | Pritchard et al. |
| 8,342,307 B2 | 1/2013 | Christoffer et al. |
| 8,511,451 B2 | 8/2013 | Ledetzky et al. |
| 8,577,571 B2 | 11/2013 | Einfinger |
| 8,607,951 B2 | 12/2013 | Schauer et al. |
| 8,662,275 B2 | 3/2014 | Sardella |
| 8,757,342 B2 * | 6/2014 | Takata .................. F16D 23/025 192/107 M |
| 9,062,720 B2 | 6/2015 | Binder et al. |
| 2012/0090941 A1 * | 4/2012 | Appelshaeuser ....... F16D 23/06 192/53.3 |

* cited by examiner

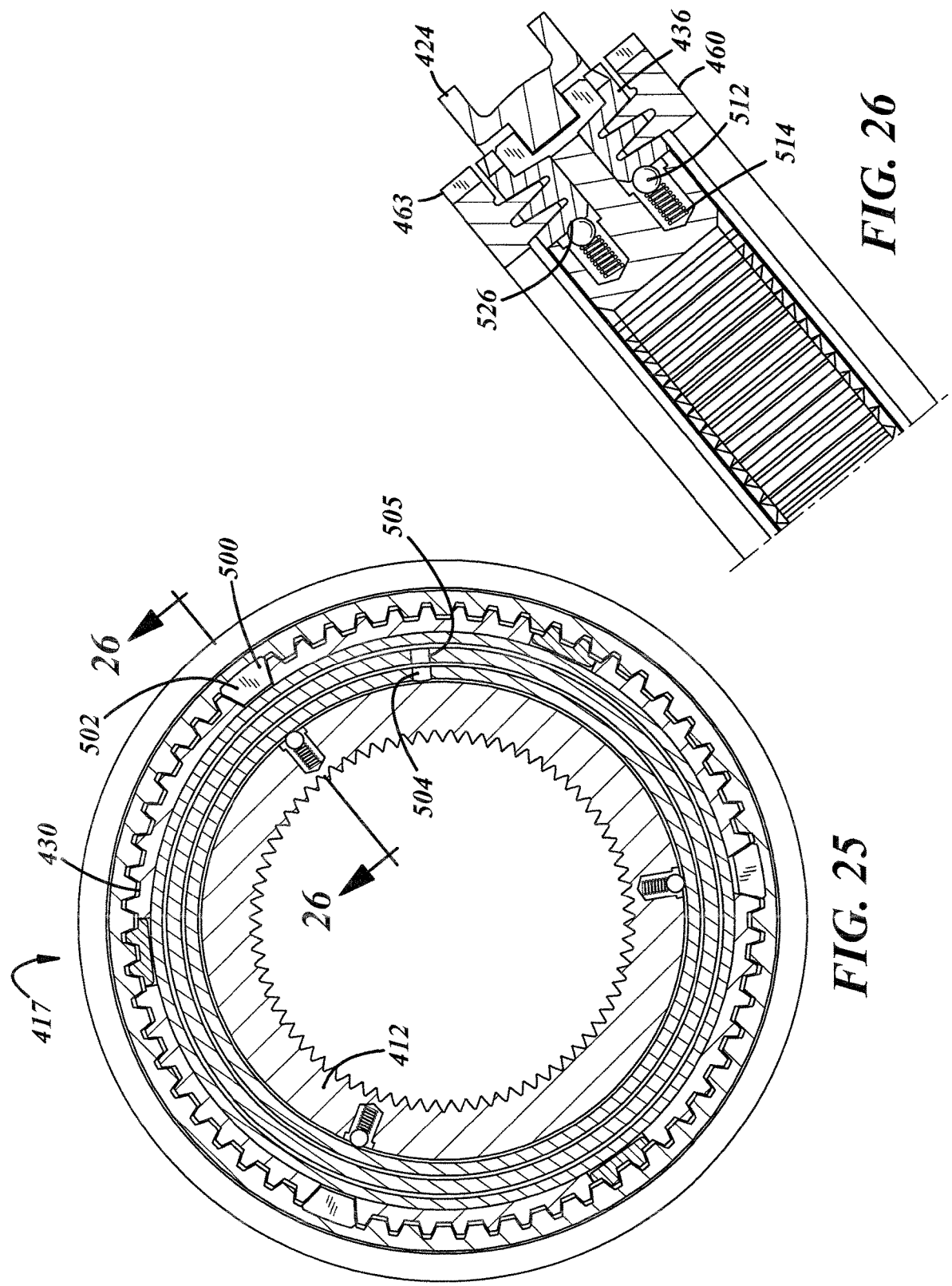

REDUCED AXIAL LENGTH INCREASED CAPACITY SYNCHRONIZER

FIELD OF THE INVENTION

The field of the present invention is that of synchronizers useful in automotive transmissions and methods of utilization thereof.

BACKGROUND OF THE INVENTION

In many automotive manual transmissions or dual clutch transmissions power is transferred between meshed gears mounted on two parallel rotating shafts. An example of a dual clutch transmission is provided in commonly assigned U.S. Pat. No. 8,342,051. On one or more of the parallel shafts, there are multiple rotatably mounted gears. The gear ratio of the transmission is dependent upon which gears are selectively torsionally connected to the shafts. As is apparent to those familiar with the art, for the gear to be torsionally connected to a shaft, the gear must first have its speed synchronized with the speed of the shaft. Accordingly synchronizers are provided to torsionally connect the gears to their respective shaft.

Referring to FIGS. 1-9, a dual gear synchronizer 10 that works similarly to that shown and explained in Frost, U.S. Pat. No. 5,135,087 (disclosure incorporated by reference herein). Since operation of the dual gear synchronizer is essentially identical for both sides of the synchronizer 10 only one side is explained. The synchronizer 10 has a hub 12. The hub 12 is spline connected to a shaft 17 (shown in FIG. 9) along the hub's inner diameter inner diameter 14 (FIG. 2). The hub 12 along its outer diameter has six circumferential segments 16 with spline teeth 18. Positioned between the segments 16 are three geometrically spaced sleeve detent members 20. The detent members 20 capture a coil spring 19 (FIG. 9) radially outward loaded bearing ball 22. The detent members can also travel axially with respect to the hub 12 between the segments 16.

Surrounding the hub 12 and torsionally connected thereto is a sleeve 24. The sleeve 24 has two axially spaced apart rims 25 projecting radially outward to provide a nest 26 to capture a shift fork 28 (shown partially in phantom in FIG. 9) of the transmission. An inner diameter 27 (FIG. 1) of the sleeve 24 has a series of axial spline teeth 30 allowing the sleeve 26 to be torsionally fixedly connected and axially movable on the spline teeth 18 of the hub. The sleeve detents 20 press balls 22 into depressions 34 (FIG. 1) provided in the inner diameter the sleeve 24.

Lateral of the sleeve 24 is a blocking ring(s) 36. The blocking ring 36 has the geometrically spaced tabs 38 that torsionally connect the blocking ring with the hub 12 in a lost motion manner. Tab 38 is clocked or captured between hub segment surfaces 47 and 49 of the hub. The angular shift (lost motion) between the hub or sleeve 24 when tab 38 surface 41 contacts hub segment surface 47 to where tab surface 43 contacts hub surface 49 is approximately 6 degrees. The blocking ring 36 also has an operatively associated alpha friction surface 40. The blocking ring 36 also has a series of blocking cogs or teeth 42.

Lateral of each blocking ring 36 is an intermediate ring 48. Lateral of the intermediate ring 48 is an inner ring 52. Lateral of the inner ring 52 is an engagement ring 60. The engagement ring 60 is fixedly connected with a gear 61 (shown partially in FIG. 9) to be torsionally connected with the shaft 17. The engagement ring 60 has cogs 63 (shown in greater detail in FIGS. 3-8). Intermediate ring 48 has tabs 62 axially extending toward the engagement ring 60. The tabs 48 extend into radial slots 64 of the engagement ring to torsionally connect intermediate ring 48 with the engagement ring 60. In a similar fashion the inner ring 52 has axially extending tabs 68. The tabs 68 extend into radial slots 78 provided in the blocking ring to torsionally connect inner ring 52 to the blocking ring 36 and to operatively associate inner ring alpha friction surface 51 with the blocking ring 36.

In operation the shift fork 28 (not shown in FIGS. 3-8) moves sleeve 24 leftward from a neutral position shown in FIG. 3 to a pre-synchronization position shown in FIG. 4. The sleeves 24 leftward movement (FIG. 3) also causes the sleeve detents 20 to be moved leftward in relationship to the hub 12 causing detent side surface 71 to push against blocking ring side surface 73 (see additionally FIG. 9). The leftward movement of the blocking ring 36 causes the friction surface 40 of the blocking ring 36 to contact in sliding frictional engagement the outer friction surface 75 of the intermediate ring 48. Since the intermediate ring 48 via the tab 62 is torsionally connected with the engagement ring 60 the friction surface 75 and its operatively associated engagement ring 60 are accelerated. Additionally intermediate ring 48 is frictionally driven by inner ring 52, the inner ring 52 being torsionally connected with the blocking ring 36. Therefore the intermediate ring 36 on its outer 75 and inner 80 surfaces through sliding frictional engagement will be acted upon by blocker ring 36 to accelerate the engagement ring 60. Assuming rotation of the shaft 17 and the yoke in a direction 81 (FIG. 1), intermediate ring tab surface 43 is contacting surface 49 of the hub. With the drag caused by the inertia of the accelerating gear 61/engagement ring 60 on the blocking ring 36, the blocking ring tab surface 43 contacts hub surface 49 with increased force. As shown in FIG. 5 the cogs 42 of the blocking ring are now in a blocking position contacting tips 85 of the spline teeth 30 of the sleeve, preventing further axial movement of the sleeve 24 (FIG. 5). Until the engagement ring 60 and its connected gear 61 are synchronized with the sleeve 24, the cogs 42 of the blocking ring continue to prevent further leftward travel of the sleeve 24. Eventually the engagement ring 60 (and connected gear 61) are brought to a speed that is synchronized with that of the shaft 17 (equal to that of the hub 12). Upon reaching synchronous speed leftward movement of the sleeve 22 (FIG. 6) will now cause the tips 85 of the sleeve teeth to cam the cogs 42 of the blocking ring over to allow continued leftward movement of the sleeve 24 to the point wherein the sleeve spline teeth 30 extend (FIG. 7) to the spacing between the engagement ring cogs 63. Continued movement of the sleeve 24 will lock in the engagement ring 60 and the torsional connection of gear with the shaft is complete (FIG. 8).

It is readily known to those skilled in the art for the last decades there has been a major push to increase the fuel economy of automotive vehicles. Accordingly, it is desirable to reduce the spatial envelope of the power train as much as possible to maximize interior passenger room of the vehicle while minimizing the spatial envelope of the vehicle body to reduce aerodynamic drag thereby increasing fuel efficiency. Therefore, it is desirable to provide a synchronizer in a smaller spatial envelope than those revealed previously. It is also desirable to provide a synchronizer with high synchronization capacity while at the same time minimizing the number of components.

SUMMARY OF THE INVENTION

To make manifest the above delineated and other desires, a revelation of the present invention is brought forth. In a preferred embodiment, the present invention brings forth a freedom of a synchronizer for torsionally connecting a gear to an axially aligned shaft in a smaller axial spatial envelope. The preferred embodiment includes a hub for torsional connection with the shaft. A sleeve is provided having an inner diameter with spline teeth for torsional connection with the hub and is axially movable upon the hub. A sleeve detent is provided axially slidable on the hub and is positioned between the hub and the sleeve. A blocking ring is provided, torsionally connected on the hub having an angular lost motion relationship with the sleeve. The blocking ring has first and second annular conical friction surfaces. The blocking ring also has blocking cogs preventing axial movement of the sleeve towards the gear when the gear is in a nonsynchronous condition.

An engagement ring is also provided having fixed connection with the gear. The engagement ring has annular conical friction surfaces complementary with the annular conical friction surfaces of the blocking ring.

In another preferred embodiment of the present invention, the synchronizer sleeve has long and short teeth. The sleeve's short teeth interact with the cogs of the blocking ring. The sleeve's long teeth transmit torque from the hub to the gear via the engagement ring cogs. The novel arrangement of short and long teeth of the sleeve allows the axial spatial envelope of the synchronizer to be reduced.

In yet another preferred embodiment the present invention synchronizer has a compliant detent between the hub and the blocking ring to bias the blocking ring towards the hub allowing the blocking ring to be axially positioned away from the engagement ring during non-actuation of the gear thereby reducing rattle and resulting noise of the synchronizer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 25 is a sectional view taken along line 25-25 of FIG. 23; and

FIG. 26 is a sectional view taken along line 26-26 of FIG. 25.

DETAILED DESCRIPTION OF THE PREFERRED EMBODIMENTS

The following description of the preferred embodiment(s) is merely exemplary in nature and is in no way intended to limit the invention, its application, or uses.

Figure 13:
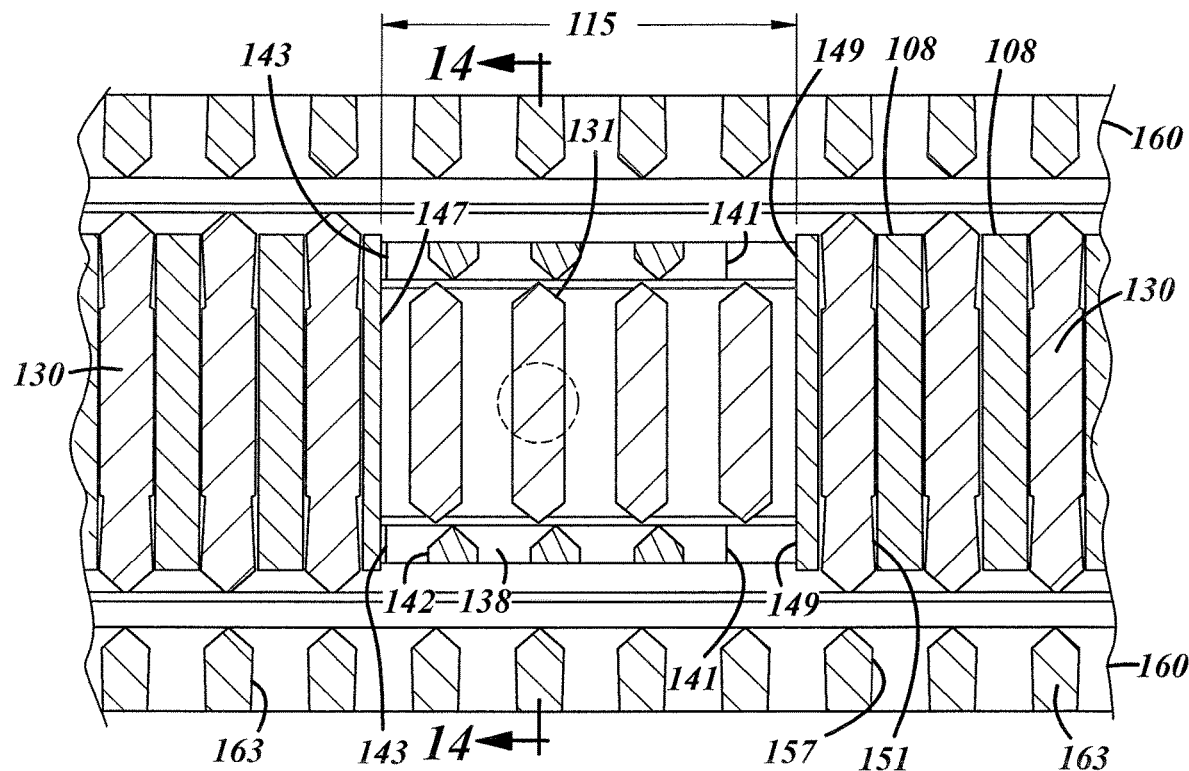
FIG. 13 is a schematic roll out view taken along arcuate line 13-13 of FIG. 10.
Figure 14:
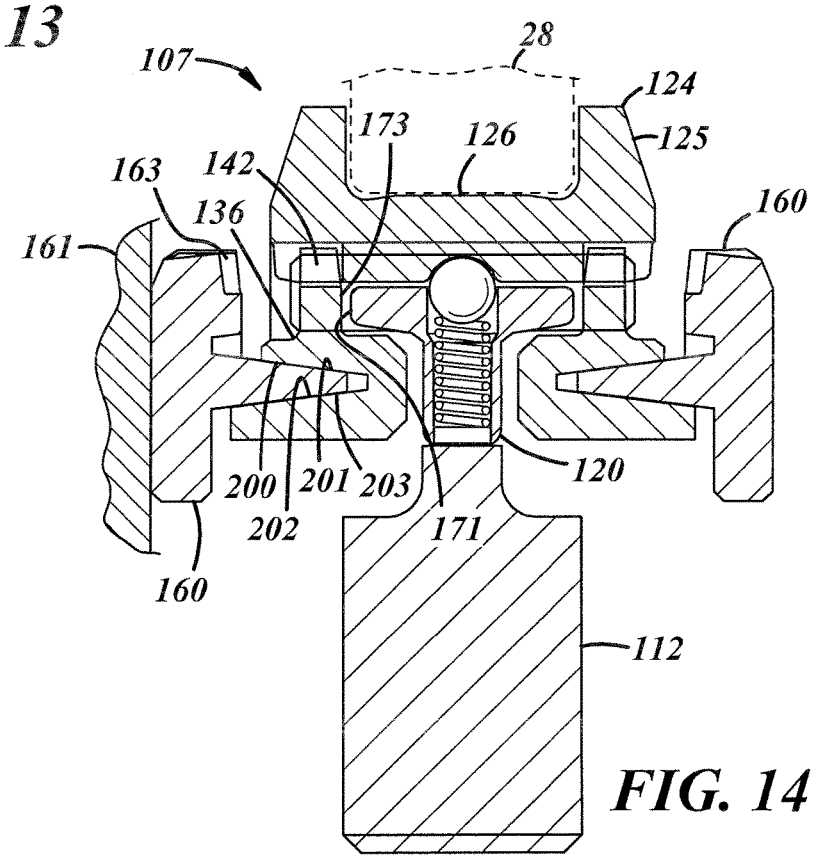
FIG. 14 is a sectional view of a single cone preferred embodiment synchronizer according to the present invention taken along line 14-14 of FIG. 10.
Figure 19:
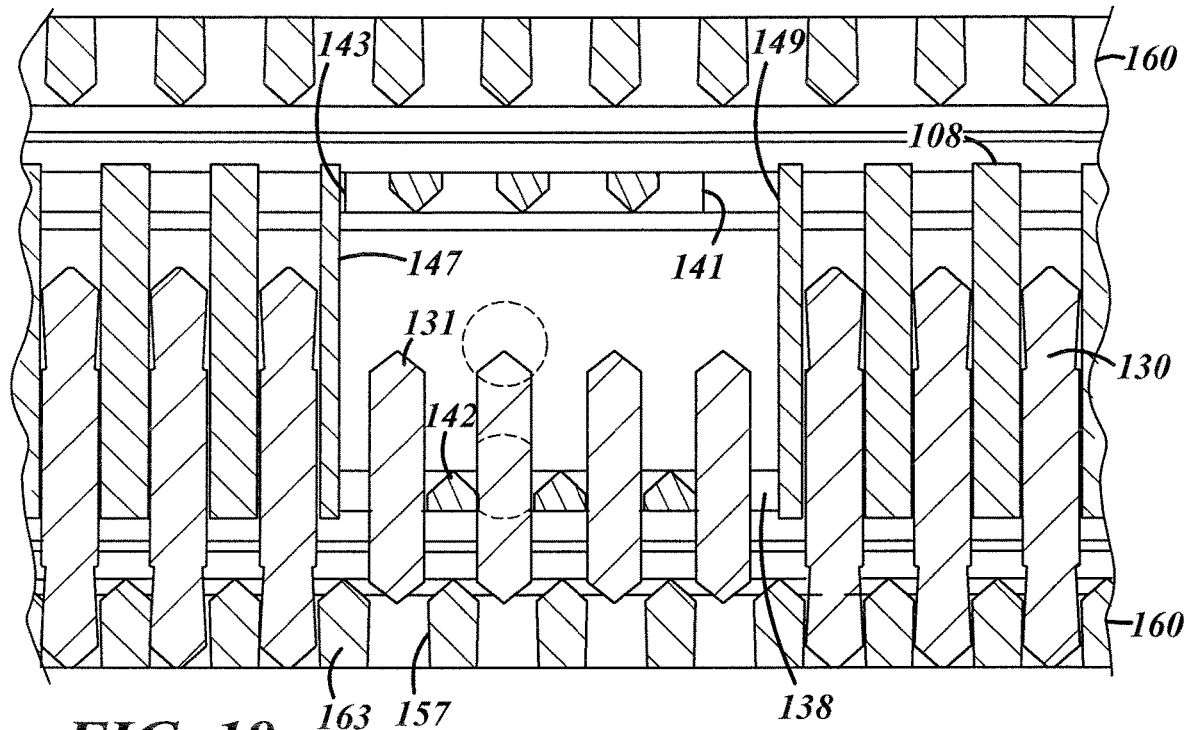
FIG. 19 is an operational view subsequent to the position shown in FIG. 17.
Figure 20:
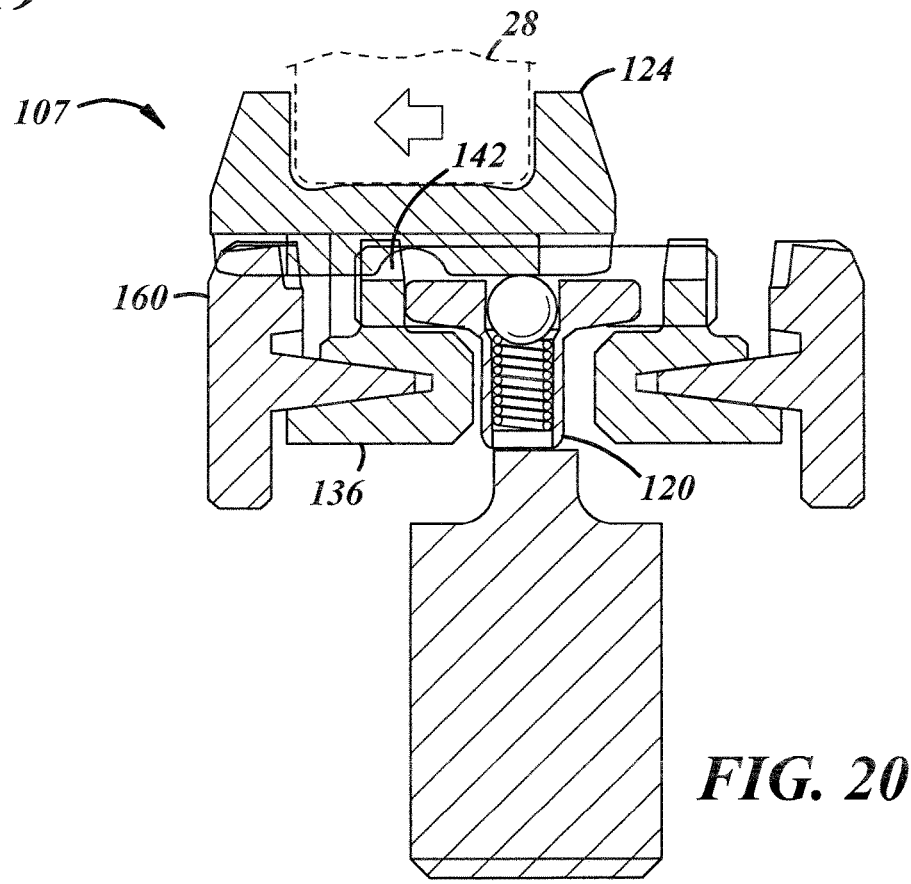
FIG. 20 is an operational view subsequent to the position shown in FIG. 18.
Figure 21:
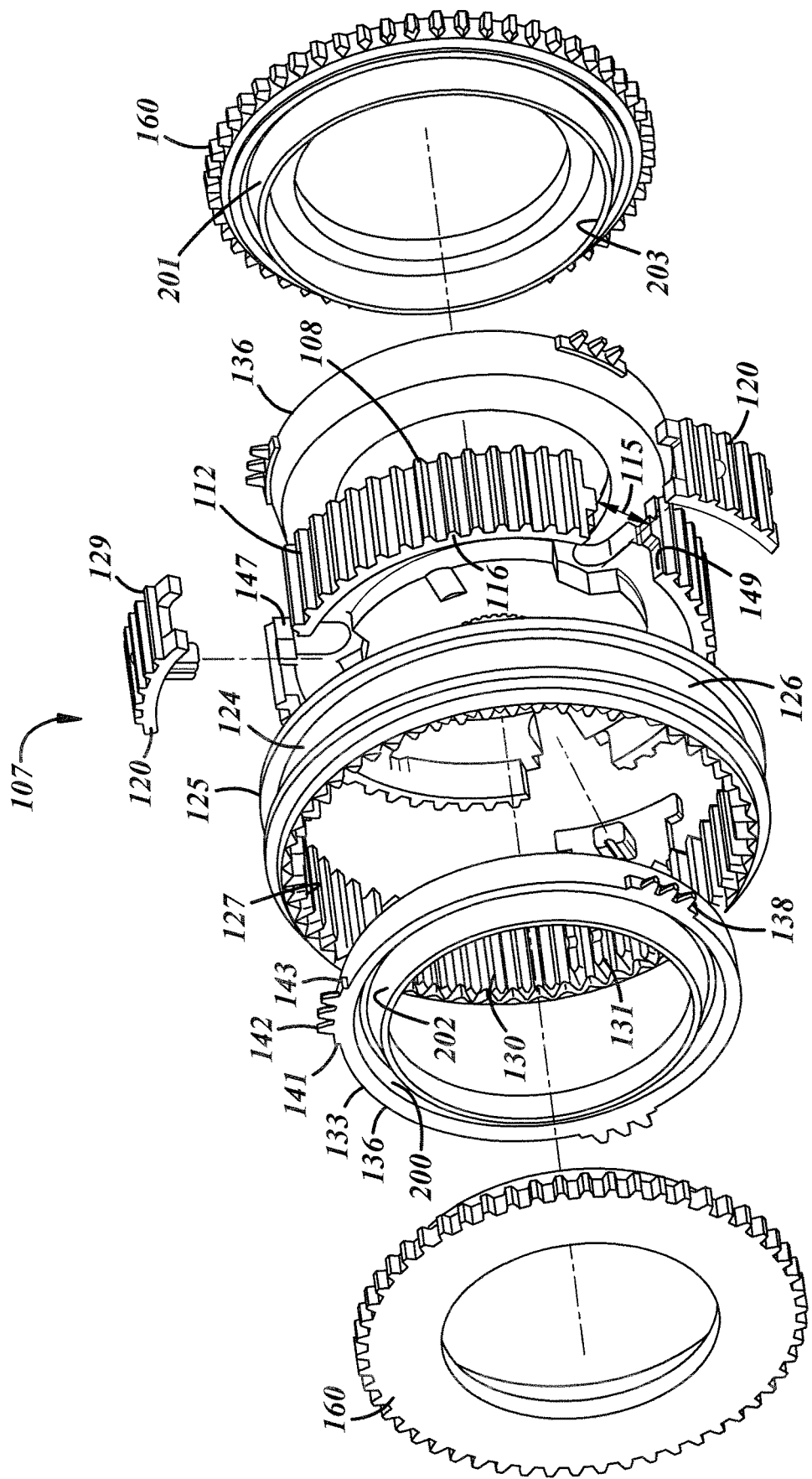
FIG. 21 is an exploded view of the preferred embodiment synchronizer shown in FIGS. 10 and 13 through 20.

Referring primarily to FIGS. 14 and 21 and additionally to FIGS. 10, 13 and 15-20, a dual gear synchronizer 107 of the present invention has a hub 112. Hub 112 has gaps or indentions 115 for receipt of detents 120. Hub 112 has 3 geometrically spaced segments 116 having spline teeth 108 in a manner similar to that described for prior hub 12.

Sleeve 124 has two spaced apart rims 125 projecting radially outward to provide a nest 126 to capture a shift fork 28 as previously described. An inner diameter 127 of the sleeve has three sets of four geometrically spaced axially short spline teeth 131 (FIG. 13) with the remainder of the spline teeth being axially long spline teeth 130. The short teeth 131 are aligned with indentions 115 between the hub segments 116.

Lateral of the sleeve 124 is a blocking ring(s) 136. The blocking ring 136 has three geometrically spaced mounts 138 with edges 141 and 143 that torsionally connect the blocking ring 136 with the hub 112 and sleeve 124 in a lost motion manner with hub indention edges 147 and 149 as previously described for synchronizer 10. The blocking ring 136 has three sets of geometrically spaced blocking cogs 142 with the remainder 133 of an outer circumference of the blocking ring being smooth so as to fit radially within the long spline teeth 130 of the sleeve inner diameter.

The blocking ring 136 has at least one (alpha) first annular conical friction surface 200 orientated radially inward and axially towards the hub 112. The blocking ring 136 also has at least one (alpha) second conical friction surface 202 are orientated radially inward axially away from the hub 112.

Synchronizer 107 also has for connection with a gear 161 an engagement ring 160. The engagement ring 160 has at least one corresponding (beta) first annular conical friction surface 201 corresponding with the first annular conical friction surface 200 of the blocking ring. The engagement ring 160 also has at least one (beta) second conical friction surface 203 corresponding with the second conical friction surface 202 of the blocking ring.

Figure 1:
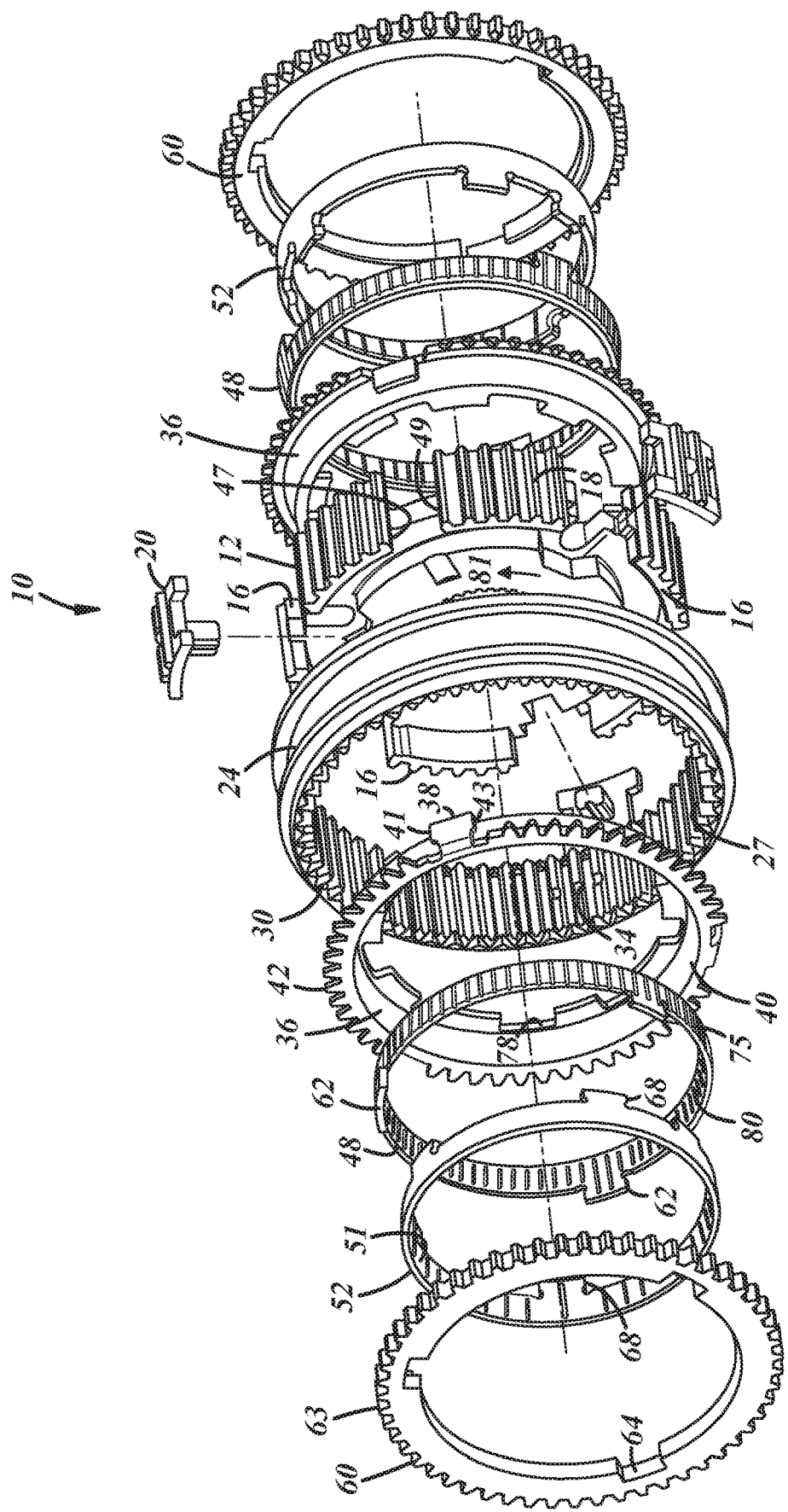
FIG. 1 is an exploded view of a synchronizer prior to the present invention.
Figure 2:
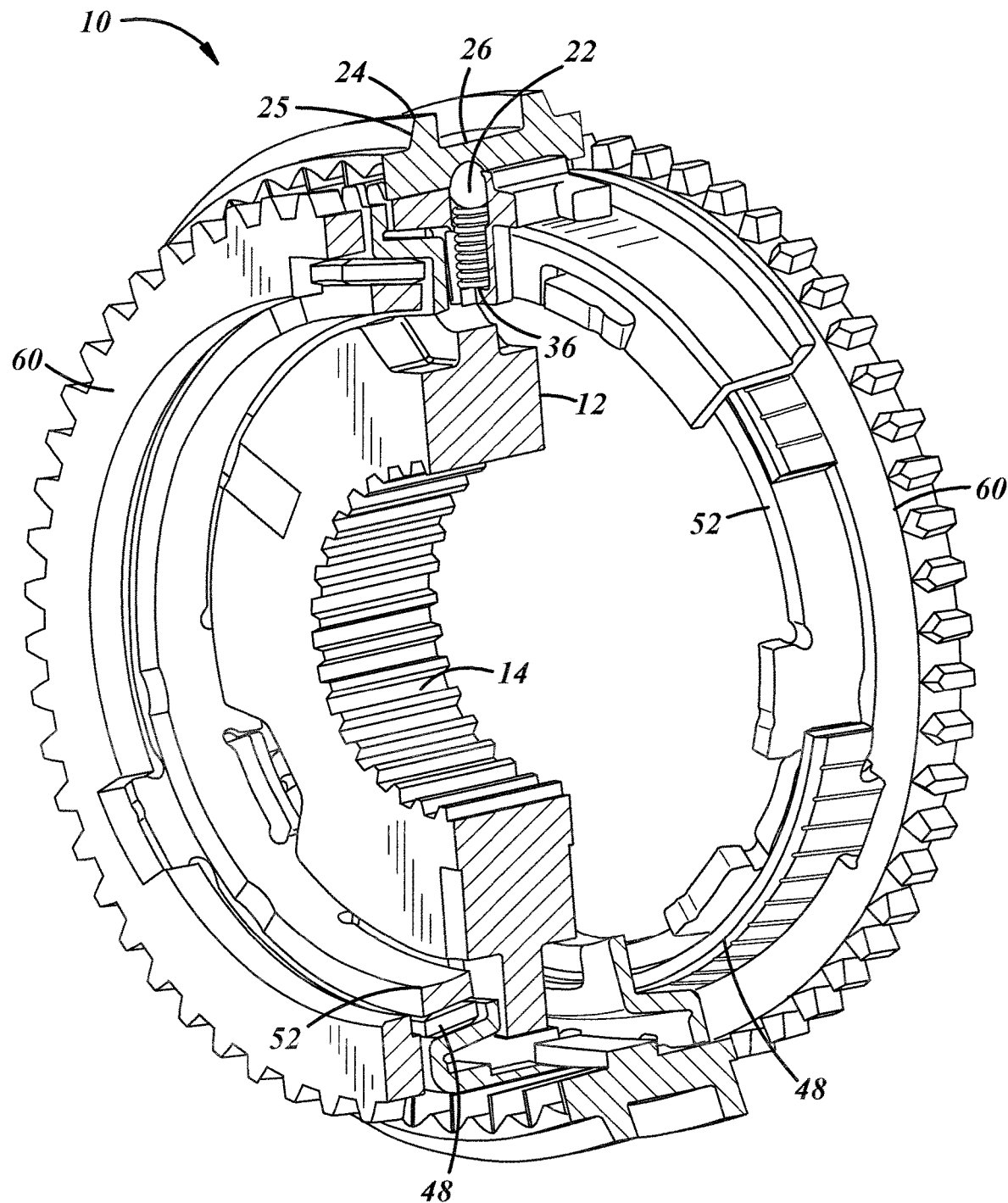
FIG. 2 is an assembled partially sectioned perspective view of the synchronizer shown in FIG. 1.
Figure 3:
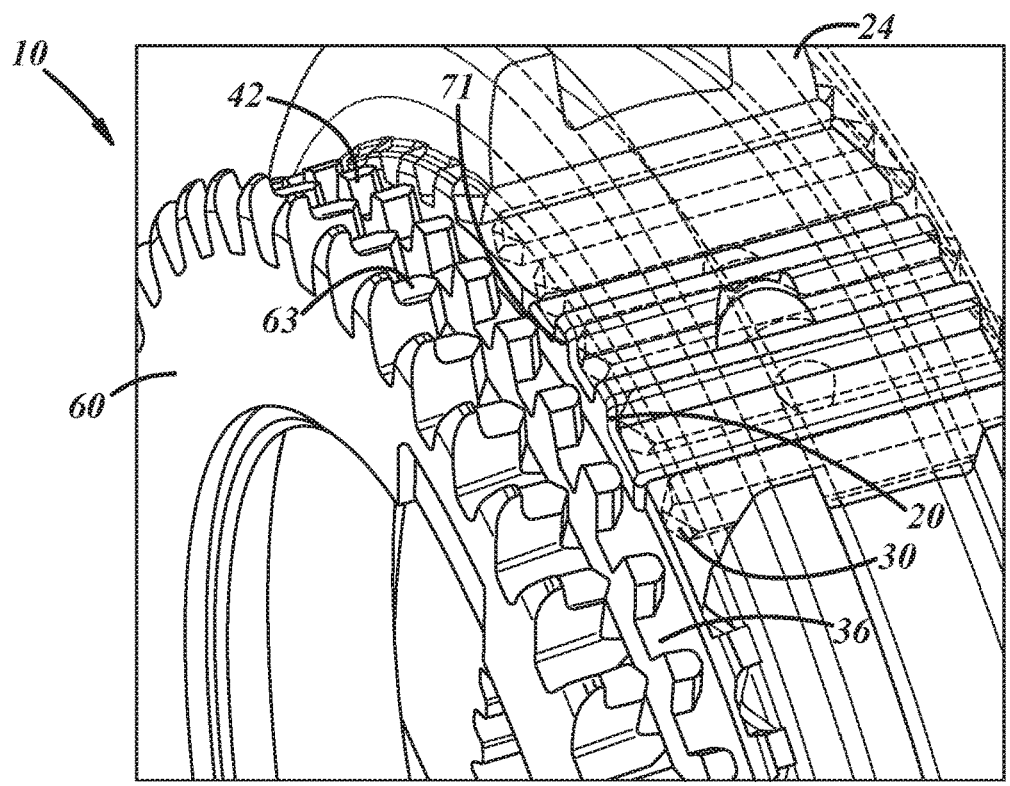
FIG. 3 is an operational view of the synchronizer shown in FIG. 1.
Figure 4:
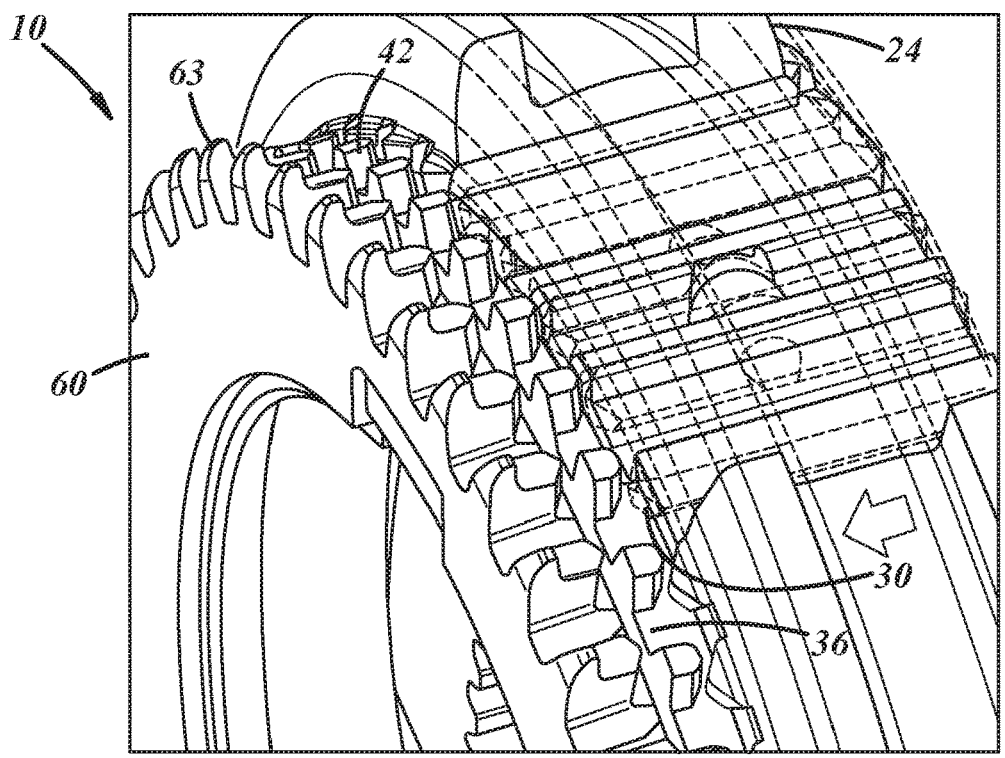
FIG. 4 is an operational view of the synchronizer shown in FIG. 1 subsequent to the position shown in FIG. 3.
Figure 5:
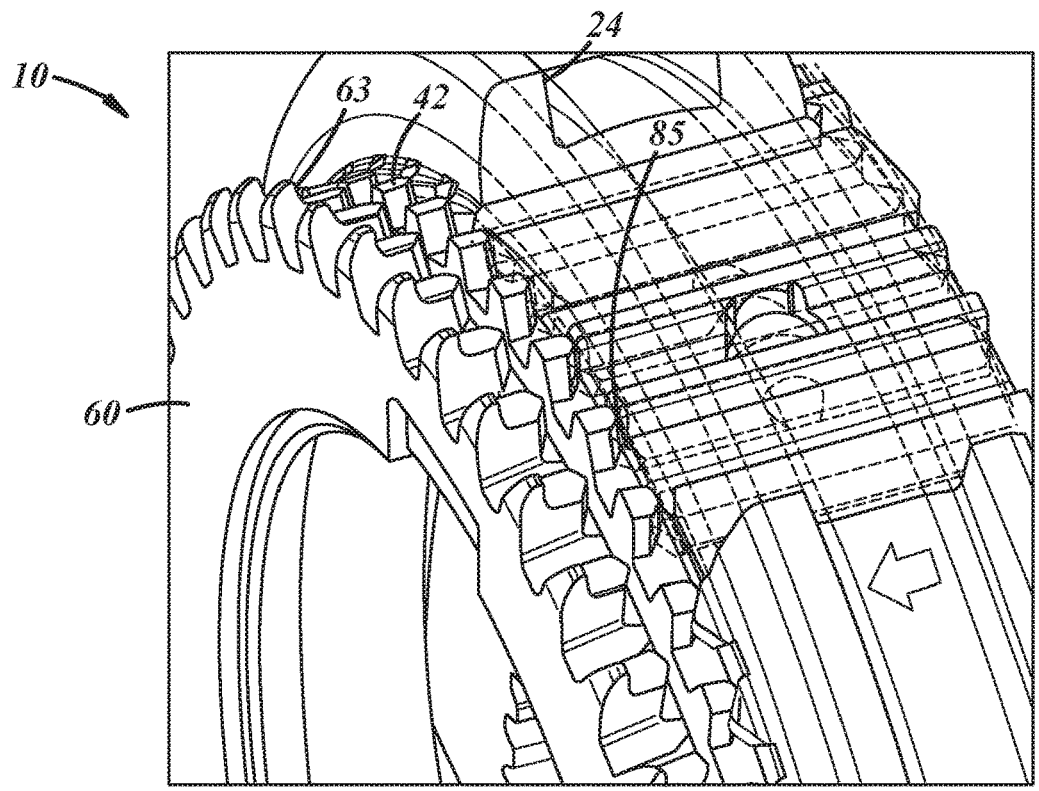
FIG. 5 is an operational view of the synchronizer shown in FIG. 1 subsequent to the position shown in FIG. 4.
Figure 6:
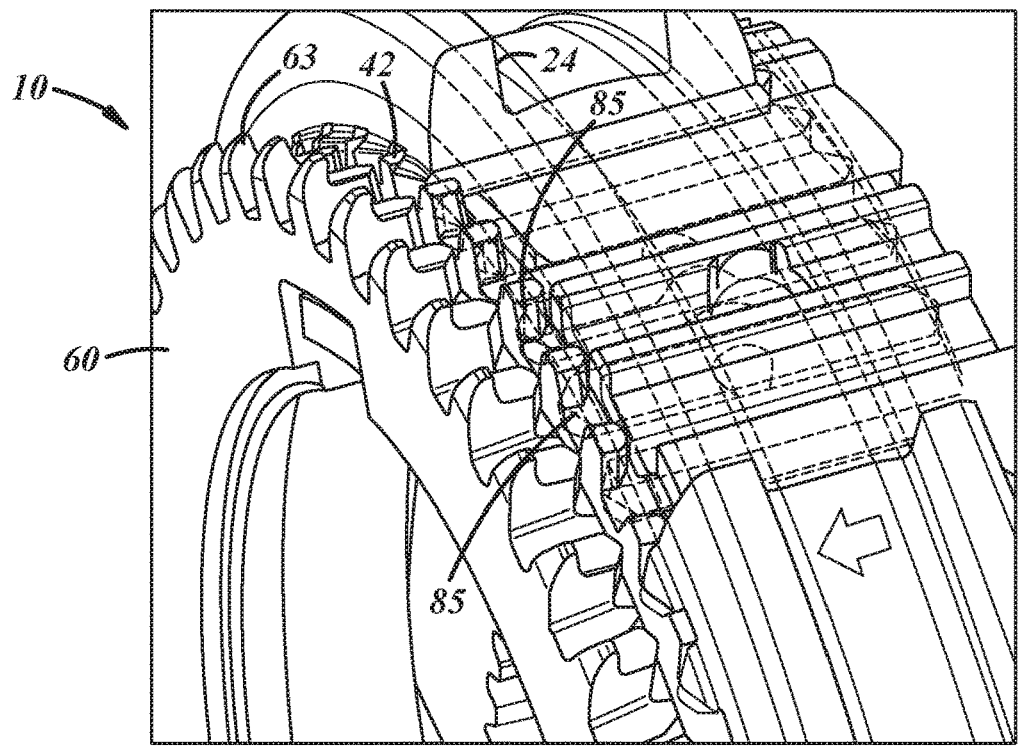
FIG. 6 is an operational view of the synchronizer shown in FIG. 1 subsequent to the position shown in FIG. 5.
Figure 7:
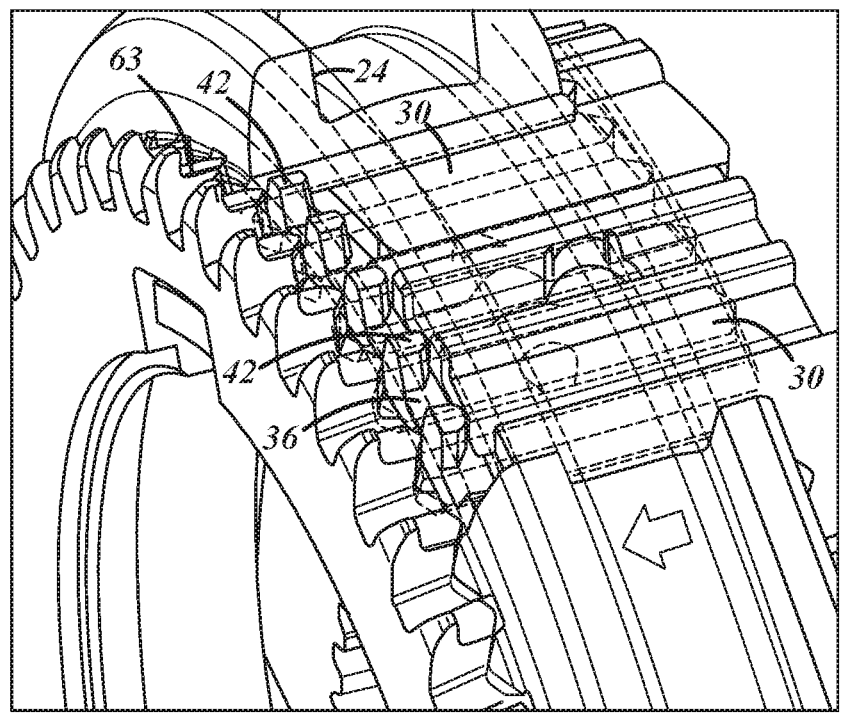
FIG. 7 is an operational view of the synchronizer shown in FIG. 1 subsequent to the position shown in FIG. 6.
Figure 8:
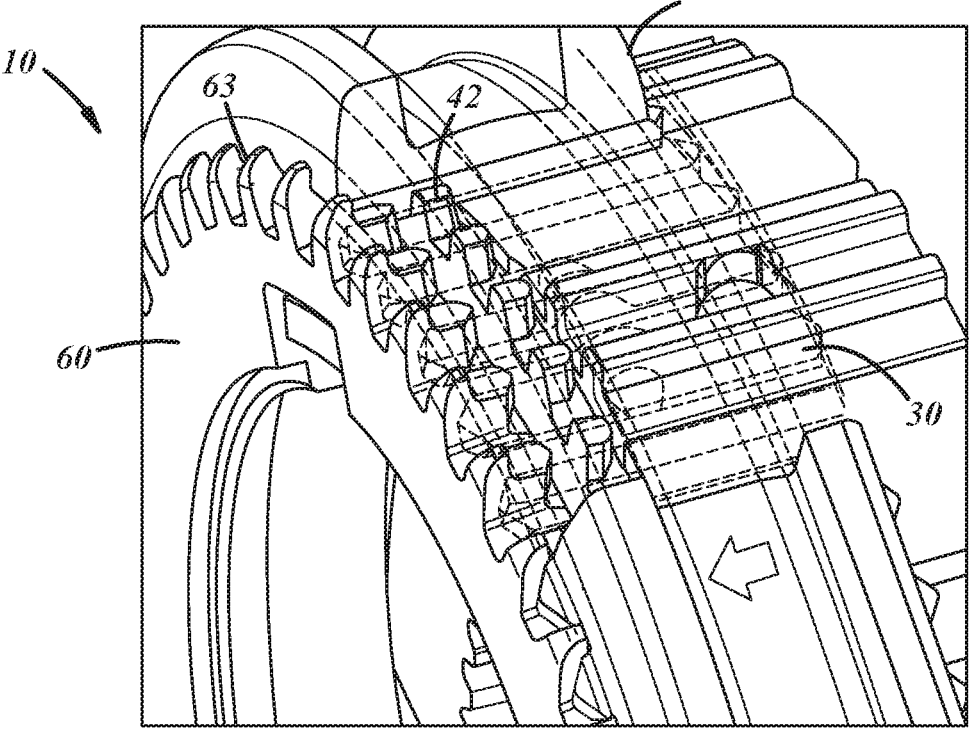
FIG. 8 is an operational view of the synchronizer shown in FIG. 1 subsequent to the position shown in FIG. 7.
Figure 9:
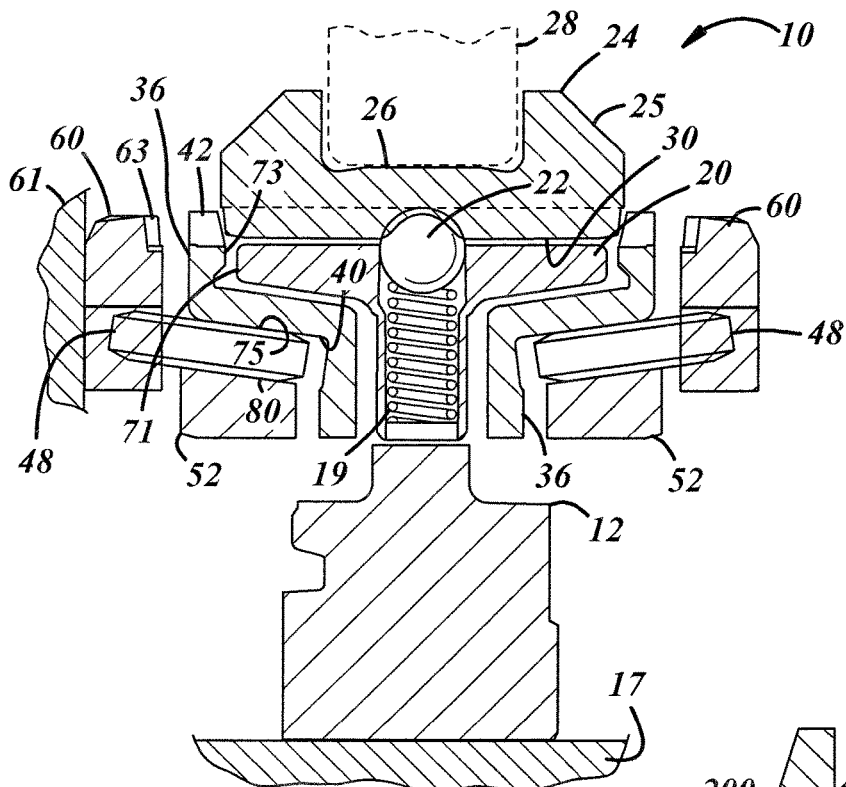
FIG. 9 is an enlarged partial sectional view of the synchronizer shown in FIGS. 1 and 2.
Figure 11:
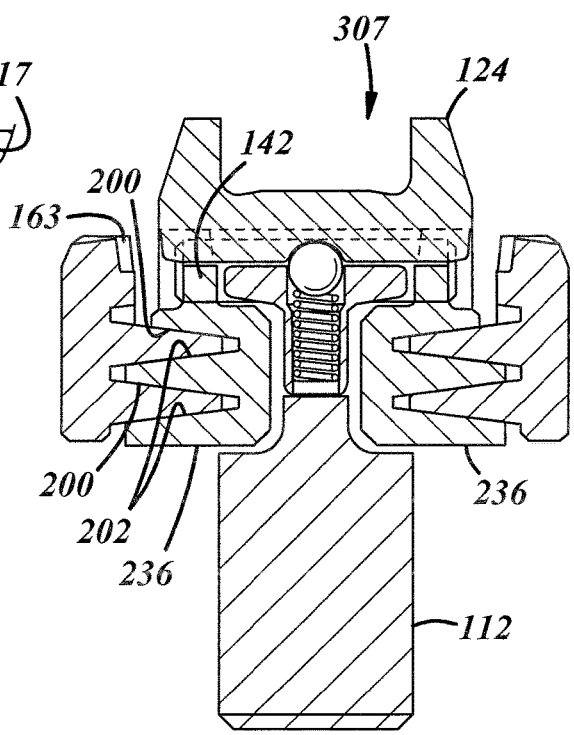
FIG. 11 is an enlarged partial sectional view of an alternate preferred embodiment synchronizer having to the preferred embodiment synchronizer shown in FIG. 14.
Figure 12:
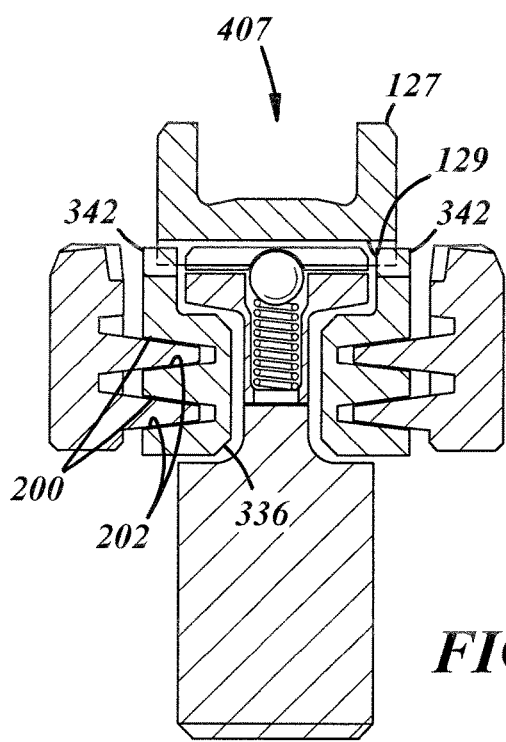
FIG. 12 is an enlarged partial sectional view of another alternate preferred embodiment synchronizer to the preferred embodiment synchronizer that is shown in FIG. 14.
Figure 10:
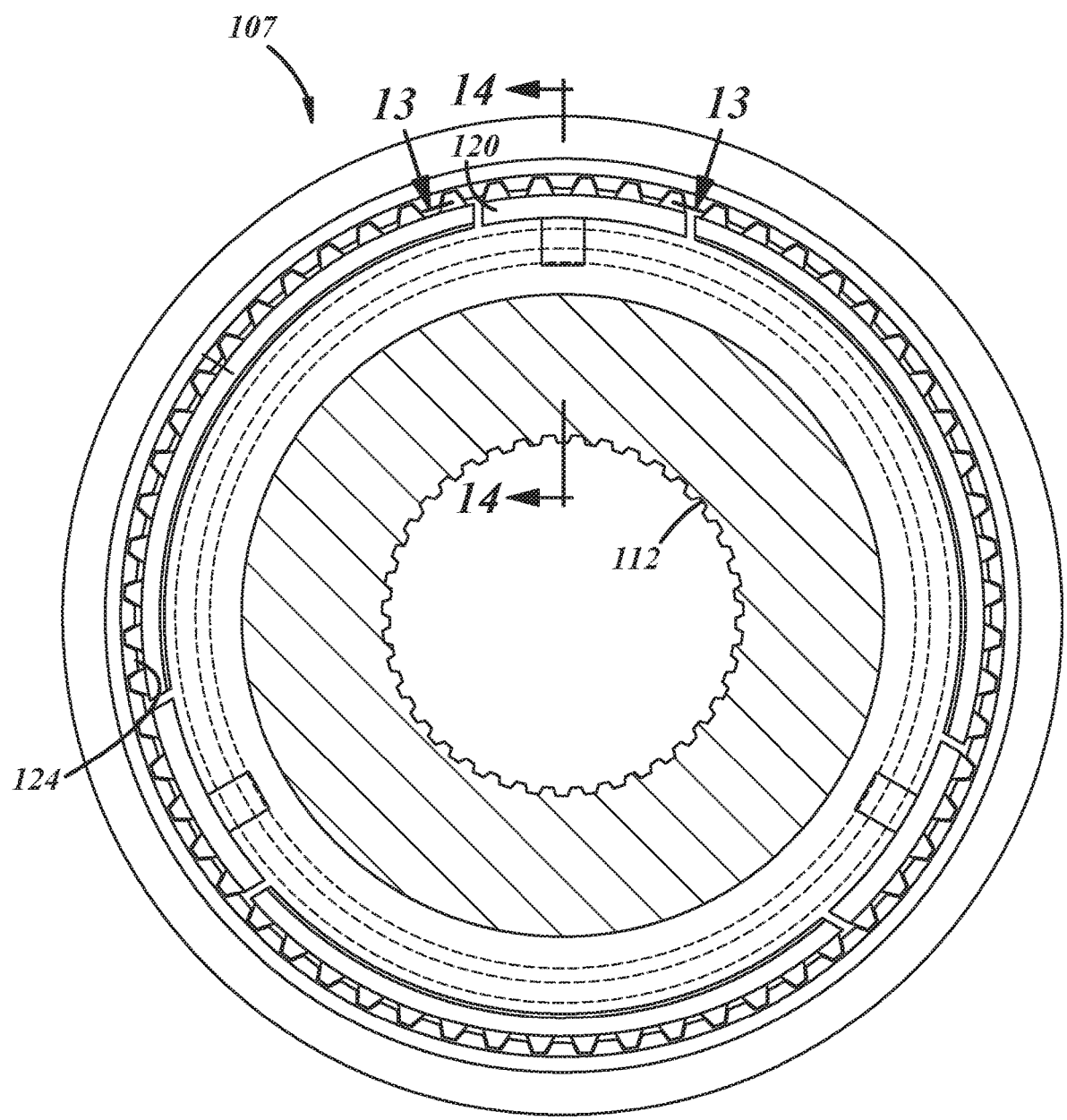
FIG. 10 is a sectional view of a preferred embodiment synchronizer according to the present invention.

Typically, the first friction surface 200 is angled between 6.5 and 9 degrees from horizontal. Typically the second friction surface is angled between 6.5 and 9 degrees from horizontal. In many applications the first friction surface 201 and 203 have angles corresponding to that for friction surfaces 200 and 202 however, if desired the angles made slightly differ to achieve a wedging effect. In the embodiments shown in FIGS. 11, 12 and 14 the annular conical friction surfaces are generated from a straight line however other curvilinear shapes involving semi straight segments generated from quadratic functions or similar shapes can be utilized. The annular friction conical surfaces can be coated with a molybdenum material, paper, or diamond like carbon material. A diamond like carbon material is sold under the trademark of CeraTough-D™ DLC coating manufactured by IBC Coating Technologies. The embodiment 107 of FIG. 14 illustrates a single cone synchronizer the present invention. The embodiment of FIG. 11 illustrates a dual cone synchronizer 307 the present invention that is substantially similar to synchronizer 107. The embodiments 407 and 417 of FIGS. 12 and 22-26 respectively illustrate special embodiments of dual cone synchronizers of the present invention which have modifications to allow them to be highly useful in extreme narrow axial space applications.

In synchronizers 107 and 307 the first and second friction surfaces 200, 202 of the blocking rings 136, 236 axially extend beyond the blocking cogs 142 of the blocking ring. Synchronizer 307 has friction surfaces 200 and 202 that extend axially to a length equal to a position of the engagement ring cogs 163. Additionally, in synchronizer 107 friction surface 200 differs in length from the longer friction surface 202. In synchronizer 407 (FIG. 12) the friction surfaces 200, 202 of the blocking ring 336 do not axially extend beyond the blocking cogs 342 of the blocking ring 336, thereby aiding the use of synchronizer 407 in an extreme narrow application.

In synchronizers 107 and 307 the sleeve 124 as mentioned previously has long teeth 130 and short teeth 131. Short teeth 131 are interlocked with teeth 129 of the sleeve detent. Long teeth 130 of the sleeve are engaged with long teeth 108 of the hub. Since the blocking ring 136 has smooth portions 133 the blocking ring, the cogs 142 of the blocking ring are axially overlapped with the short teeth 131 and the long teeth 130 of the sleeve 124.

Figure 15:
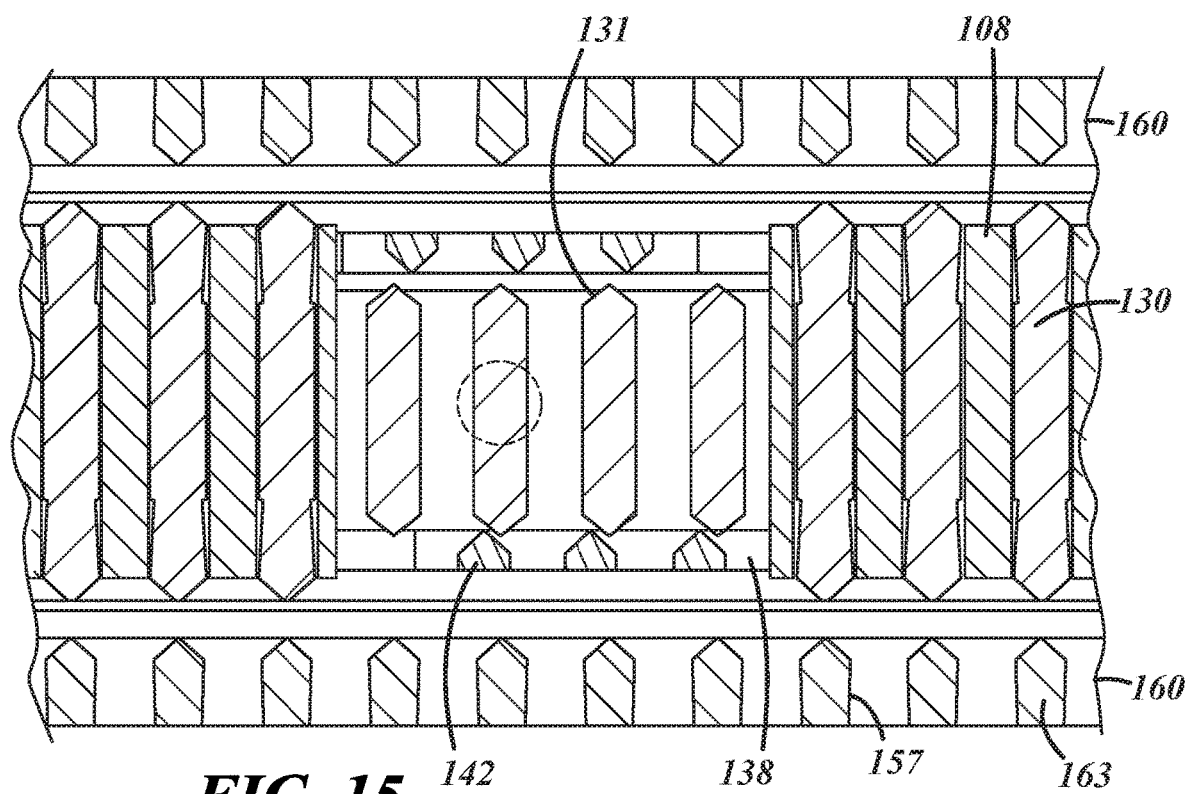
FIG. 15 is a view similar to FIG. 13 illustrating operation of the preferred embodiment synchronizer according to the present invention.
Figure 16:
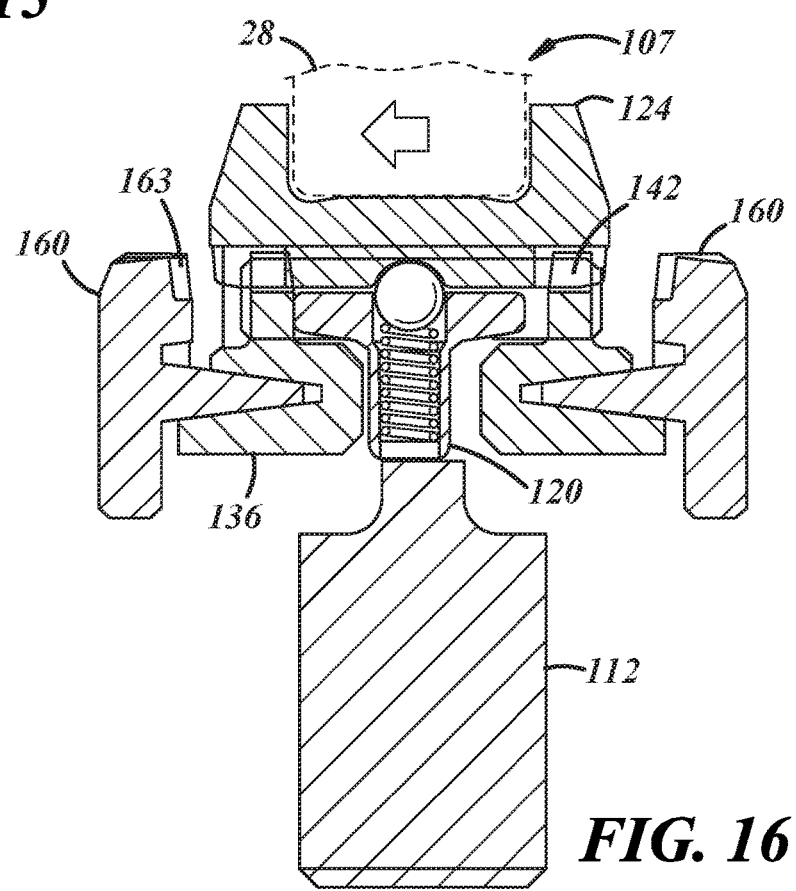
FIG. 16 is an operational view of the preferred embodiment synchronizer according to the present invention, subsequent to the position shown in FIG. 14.
Figure 17:
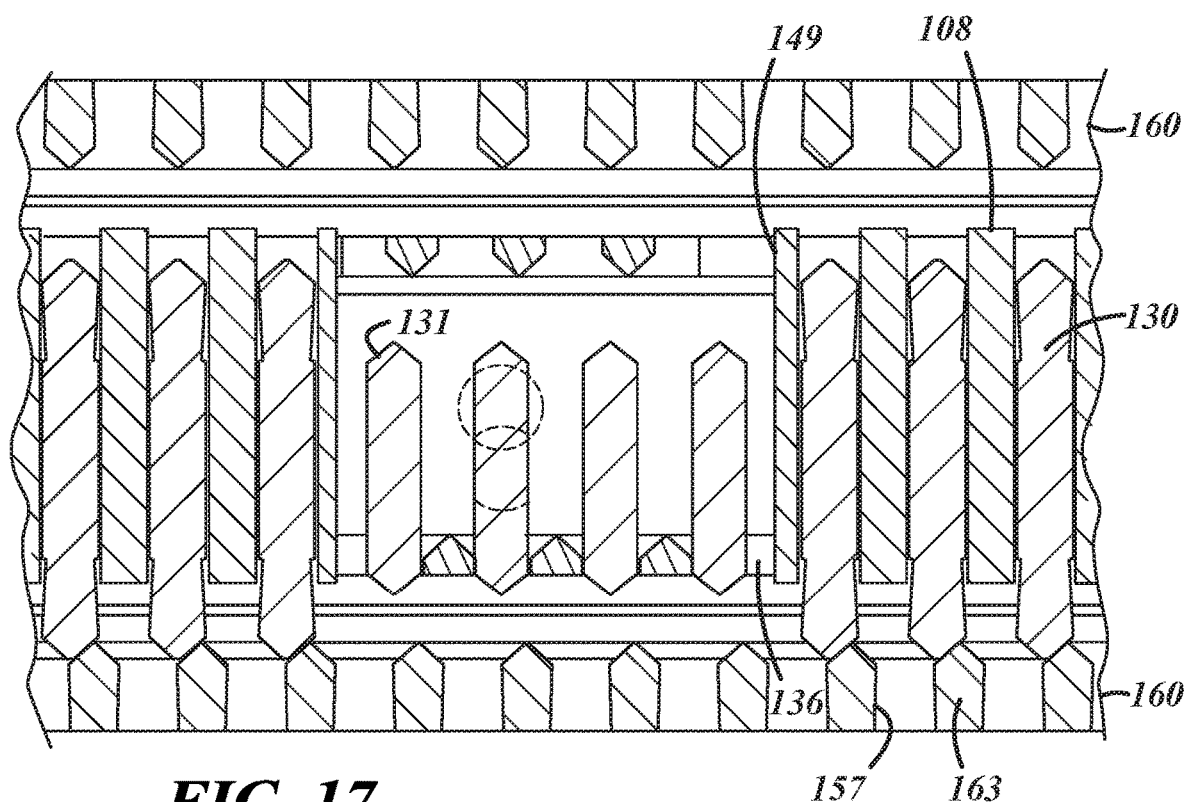
FIG. 17 is an operational view subsequent to the position shown in FIG. 15.
Figure 18:
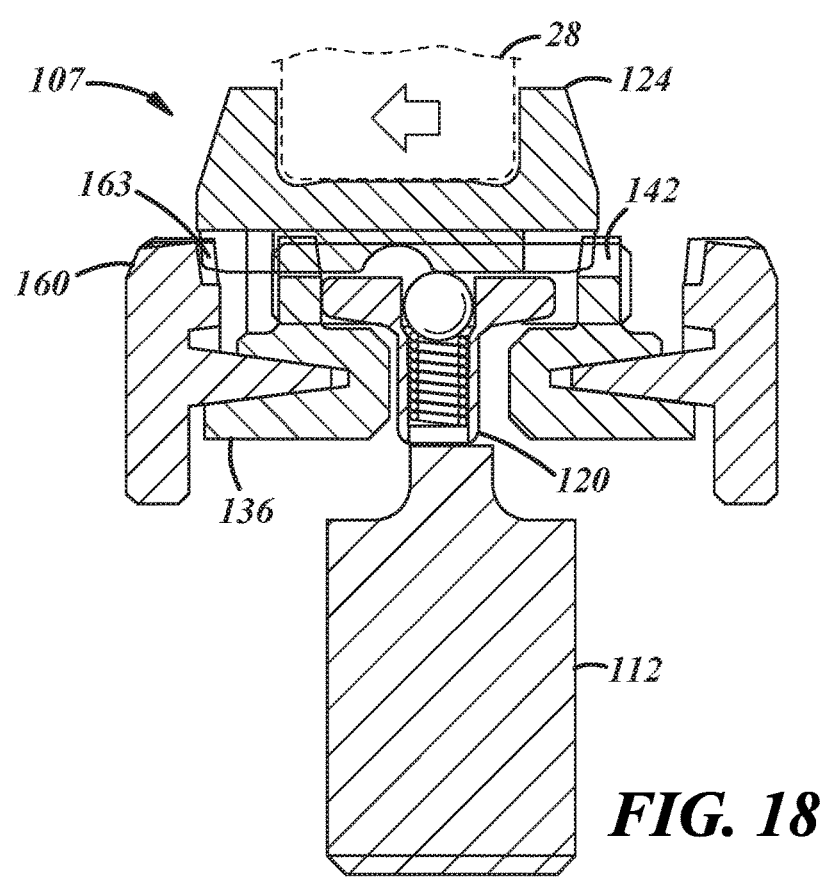
FIG. 18 is an operational view subsequent to the position shown in FIG. 16.

In operation, a shift fork 28 moves the sleeve 124 leftward from a position shown in FIGS. 13 and 14 to a position shown in FIGS. 15 and 16 as previously described for sleeve 24. Sleeve detent 120 is pulled so that its surface 171 contacts surface 173 of the blocker ring 136 to initiate engagement of the blocker ring 136 frictionally with the engagement ring 160. Mount edge 141 is forced into hub indention edge 149. This causes the tips of blocker ring cogs 142 to block further leftward movement of the sleeve by their engagement with the short teeth 131 of the sleeve (FIG. 15). After synchronization of gear 161 is achieved, the short teeth 131 of the sleeve displace cogs 142 to allow further movement of the sleeve 124 (FIGS. 17 and 18). Since the long teeth 130 of the sleeve already axially extend beyond cogs 142 of the blocker ring the travel distance required long teeth of the sleeve 131 to interlock with the cogs 163 of the engagement ring is reduced as compared with the travel required of the synchronizer 10 as previously described. Long teeth 130 side surface 151 of the sleeve are angled to make with a corresponding draft angle surface 157 on the cogs 163 to continue engagement when the gear 161 is under load (FIGS. 19 and 20). The configuration of synchronizers 107 and 307 reduces the axial space required by the synchronizer and also the radial space required by the synchronizers 107, 307 due to the configuration of the annular conical friction surfaces. Additionally, synchronizer 307 typically has a much greater torsional capacity than the synchronizer 10, while not only reducing the axial and radial space envelope of the synchronizer but additionally the need for an intermediate and an inner ring.

The synchronizer 407 has a sleeve 127 more akin to sleeve 24 as previously described with only one size of teeth 129 along its interior diameter.

Referring to FIGS. 22-26, a narrow configuration dual gear synchronizer 417 according to the present invention has a hub 412. Hub 412 has 6 teeth segments 415 with spline teeth 418. Geometrically spaced between the two teeth segments 415 are three geometrically spaced indentions 525. Axially slidably mounted, within indentions 525 are three sleeve detents 520 each detent 520 having a spring loaded ball 420.

Synchronizer 417 also has a blocking ring 436 (only one blocking gear shown in FIG. 22) having cogs 442. Blocking ring 436 also has three geometrically spaced windows 530. Additionally blocking ring 436 has three sets of geometrically spaced oil slots 504 and 505 to facilitate lubrication.

Blocking ring 436 has a mount 438 with side edges 441 and 443 to clock or give a lost motion relationship with the sleeve 424 and hub 412 by alternately contacting hub edges 547 and 549 in a manner similar to that described for synchronizer 107.

Figure 22:
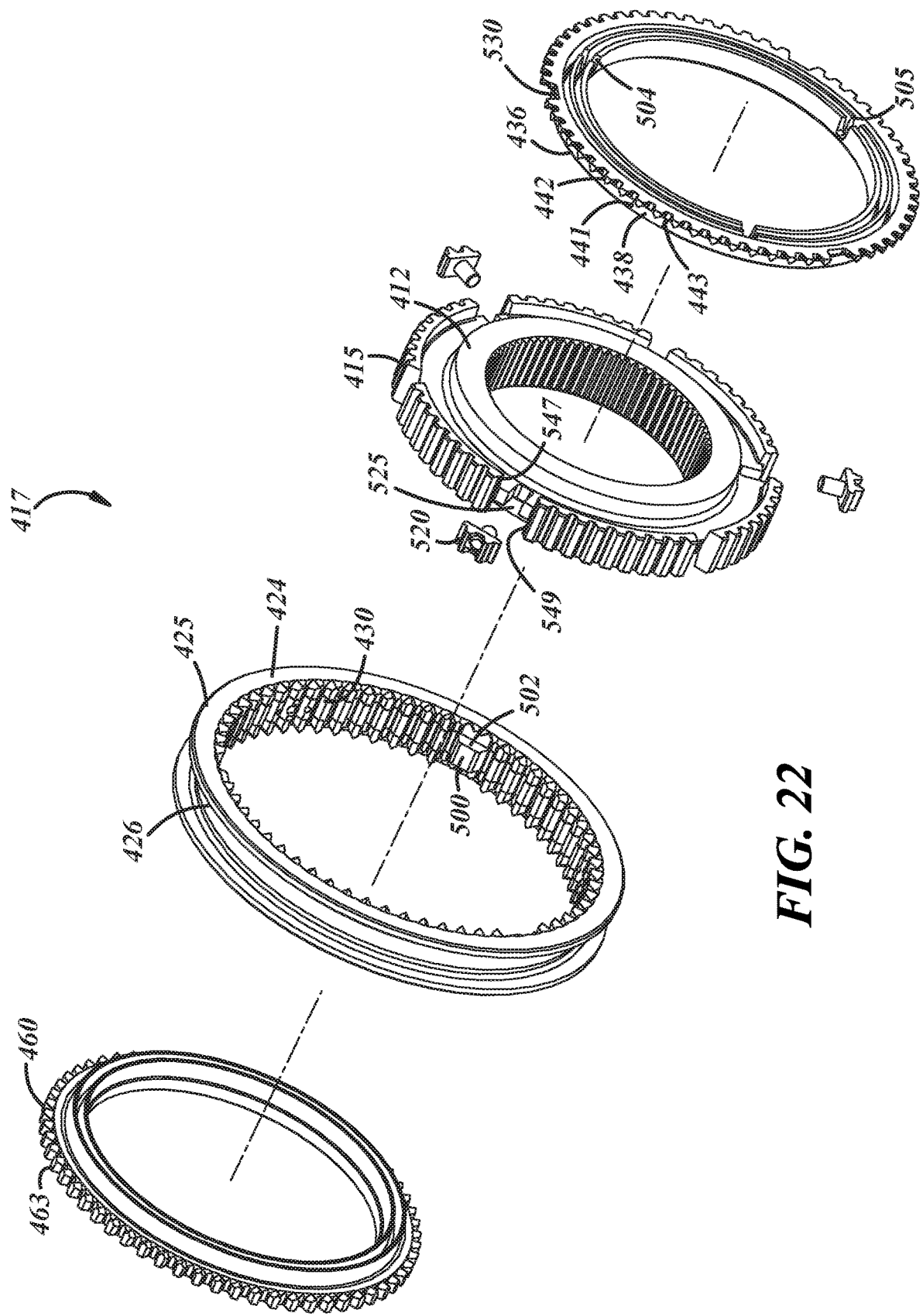
FIG. 22 is an exploded view of yet another alternate preferred embodiment synchronizer the present invention illustrating a sleeve hub, blocking ring and engagement ring that is positioned on the opposite side of the hub from the illustrated blocking ring.
Figure 24:
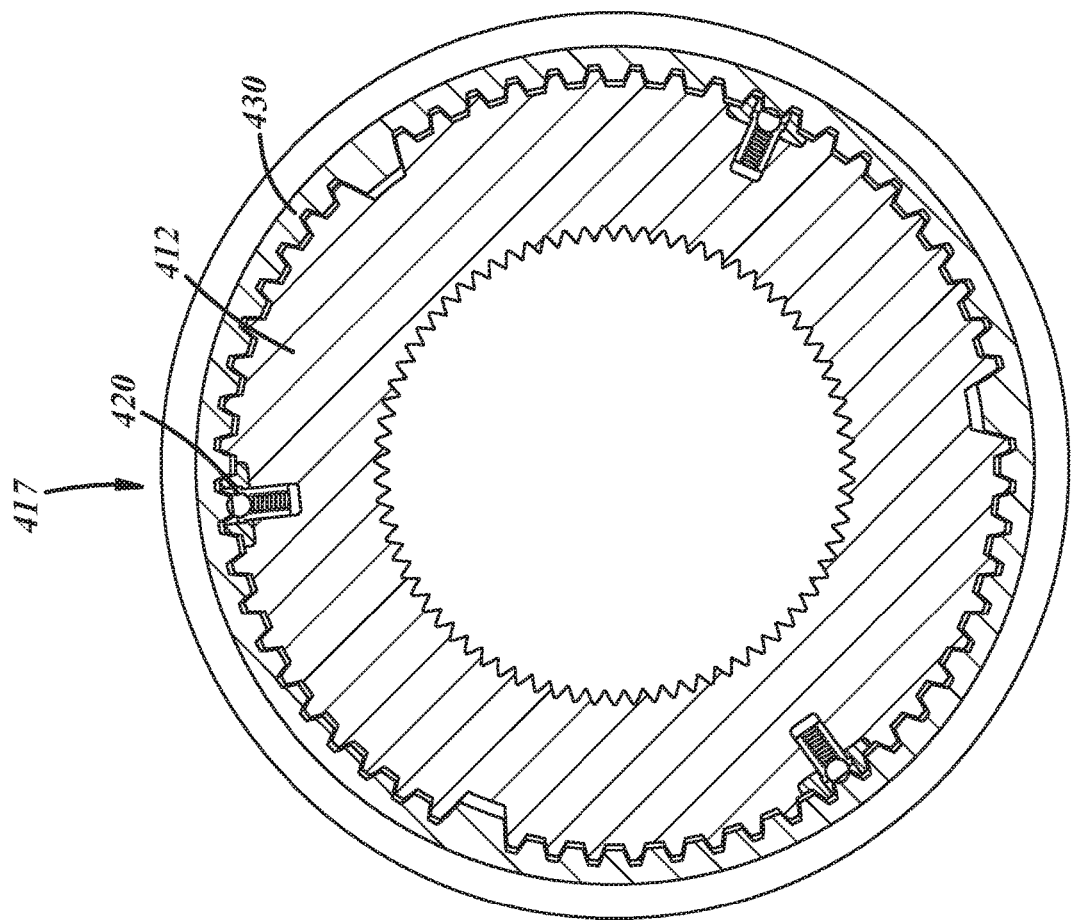
FIG. 24 is a sectional view taken along line 24-24 of FIG. 23.
Figure 23:
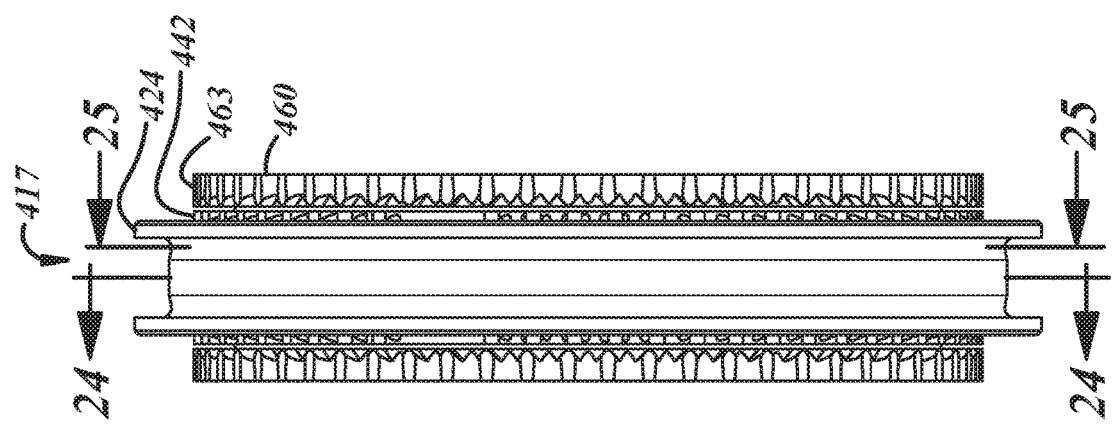
FIG. 23 is a side assembled elevational view of the synchronizer shown in FIG. 22.

Synchronizer 417 has a sleeve 424. Sleeve 424 has rims 425 and a nest 426 that function in a manner similar to that previously described for synchronizer 107. An interior of the sleeve 424 has spline gear teeth 430. The sleeve 424 along its inner diameter has three geometrically spaced limit blocks 500 having contact surfaces on both sides of 502. Limit block 500 limits the axial displacement of the sleeve 424 with respect to the hub 412 by contact with the teeth 463 of the engagement ring 460 (note: the engagement ring 460 that is on the right side of blocking ring 436 in FIG. 22 is omitted from the illustration). The blocking ring has three geometrically spaced slots 530 that allow passage of the limit block upon axial movement of sleeve.

Synchronizer 407 additionally has within its hub 412 spring-loaded blocking ring detent balls 512 biased radially outward by springs 514. The detent balls 512 contact the bottom end of the blocking ring in a partial semi spherical depression 526 at an inner diameter of the blocking ring (see FIG. 26). The blocking ring detent balls 512 bias the blocking rings 436 to a position axially away from the engagement ring 460 when a gear (not shown) attached to the engagement ring 460 is not being utilized. The axial biasing force of the detent balls 512 is overcome when the shift fork (not shown) via the sleeve 424 pulls the sleeve detent 520 to engage the blocking ring 436 into the engagement ring 460. However, the biasing force of the spring loaded ball 512 pulls back the blocking ring 436 away from engagement ring 460 whenever a gear connected with the engagement ring is released by the sleeve 424 by the movement of the sleeve 424 back to a non-engaged position by the shift fork.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A synchronizer for torsionally connecting a gear to an axially aligned shaft comprising:
   a hub torsionally connected with said shaft;
   a sleeve having an outer diameter providing a nest for connection with a shift fork, said sleeve having an inner diameter with spline teeth for torsional connection with said hub, said sleeve being axially movable upon said hub;
   a sleeve detent member connected with said hub and axially slidable therewith positioned between said hub and said sleeve;
   a blocking ring torsionally connected on said hub having an angular lost motion relationship with said sleeve, said blocking ring having at least a first annular conical friction surface orientated radially inward and axially toward said hub and a second annular conical friction surface oriented radially inward and axially outward from said hub, said blocking ring having blocking cogs preventing axial movement of said sleeve toward said gear when said gear is in a non-synchronous condition; and
   an engagement ring for fixed connection with said gear, said engagement ring having a complementary first annular conical friction surface oriented radially inward and axially toward said hub for selective engagement with said blocking ring first annular conical friction surface and a complementary second annular conical friction surface oriented radially inward and axially outward from said hub for selective engagement with said blocking ring second annular conical friction surface, and wherein said engagement ring has cogs to interact with said sleeve teeth to transmit torsional force between said gear and said hub.

2. A synchronizer as described in claim 1 wherein said synchronizer is a dual gear synchronizer.

3. A synchronizer as described in claim 1 wherein said blocking ring and said engagement ring have at least two first and second friction surfaces.

4. A synchronizer as described in claim 1 wherein said friction surfaces have a coating taken from a group including diamond like carbon coatings, molybdenum, and paper.

5. A synchronizer as described in claim 1 wherein said first annular conical friction surface is angled between 6.5 and 9 degrees from horizontal.

6. A synchronizer as described in claim 1 wherein said second annular conical friction surface is angled between 6.5 and 9 degrees from horizontal.

7. A synchronizer as described in claim 1 wherein said first annular conical friction surface is generated from a straight line.

8. A synchronizer as described in claim 1 wherein said sleeve has a short set of spline teeth for interacting with said blocking ring cogs and a long set of spline teeth for interacting with said engagement ring cogs.

9. A synchronizer as described in claim 8 wherein said blocking ring cogs and said engagement ring cogs are at a common diameter.

10. A synchronizer as described in claim 8 wherein said sleeve short teeth axially overlap said blocking ring cogs when said synchronizer is in a non-engaged position.

11. A synchronizer as described in claim 8 wherein said sleeve long teeth axially extend beyond said blocking ring cogs when said synchronizer is in a non-engaged position.

12. A synchronizer as described in claim 1 wherein said blocking ring has at least one annular conical friction surface that extends axially to at least said engagement ring cogs.

13. A synchronizer as described in claim 1 wherein said blocking ring annular conical friction surfaces do not extend axially beyond said blocking ring cogs.

14. A synchronizer as described in claim 1 wherein said sleeve teeth and said engagement ring cogs are angled to induce maintenance of engagement.

15. A synchronizer as described in claim 1 wherein one of said first and second annular conical friction surfaces for said blocking ring differs in angle to a corresponding one of said first and second friction surface for said engagement ring.

16. A synchronizer as described in claim 1 wherein said hub has a blocking ring detent to bias said blocking ring away from said engagement ring.

17. A synchronizer as described in claim 1 wherein said sleeve along an inner diameter has a limit block for contact with said engagement teeth ring cogs to limit axial travel of said sleeve toward said engagement ring.

* * * * *